US007213628B2

(12) United States Patent
Nagate et al.

(10) Patent No.: US 7,213,628 B2
(45) Date of Patent: May 8, 2007

(54) PHOTOSENSITIVE LAYER LAMINATOR AND PHOTOSENSITIVE LAYER LAMINATING METHOD

(75) Inventors: Hiroshi Nagate, Shizuoka (JP); Kazuyoshi Suehara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 60 days.

(21) Appl. No.: 10/835,472

(22) Filed: Apr. 30, 2004

(65) Prior Publication Data

US 2004/0219450 A1 Nov. 4, 2004

(30) Foreign Application Priority Data

May 1, 2003 (JP) ............................. 2003-126287

(51) Int. Cl.
*B32B 37/00* (2006.01)

(52) U.S. Cl. ...................... 156/361; 156/494; 156/498; 156/521; 156/555; 156/582; 156/583.1

(58) Field of Classification Search ........ 156/540–542, 156/556, 558, 510, 521, 361, 494, 498, 538, 156/539, 555, 582, 583.1
See application file for complete search history.

(56) References Cited

U.S. PATENT DOCUMENTS 4,495,014 A * 1/1985 Gebrian et al. ............... 156/80
4,714,504 A * 12/1987 Cummings et al. ........... 156/64
5,437,960 A * 8/1995 Nagate et al. .............. 430/256
5,720,847 A * 2/1998 Nagate et al. .............. 156/497
5,772,839 A * 6/1998 Nagate et al. .............. 156/522
6,500,291 B1 * 12/2002 Okada et al. ............... 156/230
6,684,925 B2 2/2004 Nagate et al.

FOREIGN PATENT DOCUMENTS

JP 04323031 A * 11/1992
JP 06349727 A * 12/1994

* cited by examiner

*Primary Examiner*—James Sells
(74) *Attorney, Agent, or Firm*—Sughrue Mion, PLLC

(57) ABSTRACT

Photosensitive material includes a support, and a photosensitive layer overlaid thereon and containing resin. A photosensitive layer laminator transfers the photosensitive layer from the photosensitive material to a glass substrate. In the photosensitive layer laminator, heat/pressure rollers apply the photosensitive layer to a transfer region on the substrate with heat and pressure. A photosensitive material feeder transports first and second photosensitive materials to the substrate set at the heat/pressure rollers. The first and second photosensitive materials have a width smaller than a width of the transfer region, and are disposed to extend along one another. Furthermore, a tension adjuster adjusts tension applied to the first and second photosensitive materials in an upstream direction from the heat/pressure rollers.

18 Claims, 6 Drawing Sheets

PHOTOSENSITIVE LAYER LAMINATOR AND PHOTOSENSITIVE LAYER LAMINATING METHOD

BACKGROUND OF THE INVENTION

1. Field of the Invention

The present invention relates to a photosensitive layer laminator and photosensitive layer laminating method. More particularly, the present invention relates to a photosensitive layer laminator and photosensitive layer laminating method in which a photosensitive material can be handled easily, a photosensitive layer can be transferred to an entirety of a large transfer area, and modification of mechanisms can be easy when necessitated.

2. Description Related to the Prior Art

A color filter for use in a liquid crystal display device, plasma display device and the like is produced by utilizing photosensitive material. For example, three photosensitive layers for primary colors of red, green and blue are overlaid on a substrate of glass, resin or other rigid material. Those are referred to as photo resist. A laminated panel is obtained, and subjected to exposure and photographic processing to produce the color filter according to a process of photolithography. For example, U.S. Pat. No. 6,684,925 (corresponding to JP-A 2002-148794) discloses a photosensitive layer laminator for producing a laminated panel. A photosensitive material includes a support film, and a photosensitive layer of resin overlaid on the support film. The photosensitive material and the substrate are respectively transported. Lamination rolls or heat/pressure rollers are disposed on a transporting path, and operated to transfer and laminate the photosensitive layer to the substrate.

A supply unit of the photosensitive layer laminator is loaded with one roll of the photosensitive material having a great length sufficient for a high number of sheets. A width of the photosensitive material is predetermined and depends on a width of a transfer region defined on the substrate. In operation, the photosensitive material is unwound from the roll, and subjected to half cutting to form cuts through the photosensitive layer according to a length of the substrate. Then the photosensitive material is fed to the path. The heat/pressure rollers transfer the photosensitive layer to the substrate, before the support film is peeled from the photosensitive layer to obtain the laminated panel.

Recently, display devices of an enlarged panel size have been widely available in any one of types including a liquid crystal display device, plasma display device and the like. A size of the substrate has been greater, to enlarge a width of a transfer region. The larger width of the transfer region requires a greater width of the photosensitive material. However, a roll size of the photosensitive material must be larger, to enlarge mechanisms for transporting the roll, and those for advancing the photosensitive material. A cost for modifying the photosensitive layer laminator will be considerably high. This is a serious problem inconsistent to reducing the manufacturing cost of a laminated panel as product. Also, a greater width of the photosensitive material causes problems in greater weight and more frequent occurrence of wrinkles. The handling of the photosensitive material becomes considerably difficult.

SUMMARY OF THE INVENTION

In view of the foregoing problems, an object of the present invention is to provide a photosensitive layer laminator and photosensitive layer laminating method in which a photosensitive material can be handled easily, a photosensitive layer can be transferred to an entirety of a large transfer area, and modification of mechanisms can be easy when necessitated.

In order to achieve the above and other objects and advantages of this invention, a photosensitive layer laminator for transferring a photosensitive layer from a photosensitive material to a substrate is provided, the photosensitive material including a support, and the photosensitive layer overlaid on the support and containing resin. In the photosensitive layer laminator, a laminating mechanism applies the photosensitive layer of plural photosensitive materials to a transfer region on the substrate by applying heat and pressure to the plural photosensitive materials and the substrate. A photosensitive material feeder supplies the laminating mechanism with the plural photosensitive materials directed substantially in parallel with one another and including first and second photosensitive materials, the plural photosensitive materials having a width smaller than a width of the transfer region. A substrate feeder supplies the laminating mechanism with the substrate in placement on the plural photosensitive materials.

The laminating mechanism includes at least one heat/pressure roller. The photosensitive material feeder includes a first feeding mechanism for unwinding the first photosensitive material from a first photosensitive material roll, and supplying the first photosensitive material to a first roller portion of the heat/pressure roller. A second feeding mechanism unwinds the second photosensitive material from a second photosensitive material roll, and supplies the second photosensitive material to a second roller portion of the heat/pressure roller which extends from the first roller portion.

A sum of the width of the at least first and second photosensitive materials is equal to or less than the width of the transfer region.

Furthermore, a tension adjuster adjusts tension applied to the first and second photosensitive materials in an upstream direction from the laminating mechanism.

Each of the first and second feeding mechanisms includes a tension roller for applying first and second tension to the first and second photosensitive materials upstream from the laminating mechanism. The tension adjuster includes a tension detector for measuring the first and second tension applied to the first and second photosensitive materials. A controller is responsive to information from the tension detector, for controlling the tension roller, and setting the first and second tension substantially equal to one another.

Each of the first and second photosensitive materials includes cover film, overlaid on the photosensitive layer, for protection thereof. Furthermore, a cover peeler peels the cover film from the first and second photosensitive materials transported to the substrate.

Furthermore, at least one half cutter cuts the photosensitive layer in the first and second photosensitive materials with the support uncut and in a predetermined size adapted to the transfer region with reference to a transporting direction.

The at least one half cutter comprises at least two half cutters associated with respectively the first and second feeding mechanisms, for keeping adjustable a size of the photosensitive layer to be transferred individually from one another.

A plurality of photosensitive layer portions constituted by the photosensitive layer and having the predetermined size are arranged in the transporting direction and transferred to the transfer region commonly.

The laminating mechanism produces a laminated panel having the substrate and the photosensitive layer. Furthermore, a cooler cools the laminated panel from the laminating mechanism. A support peeler for peeling the support from the photosensitive layer of the laminated panel from the cooler.

The photosensitive layer is colorable in a predetermined color which is different between the at least first and second photosensitive materials.

In one preferred embodiment, the photosensitive layer is colorable in a predetermined color which is selected from three primary colors and black color.

The at least first and second photosensitive materials are different in the width.

The photosensitive layer of the first photosensitive material is transferred for forming a predetermined visible pattern. The second photosensitive material has a width smaller than a width of the first photosensitive material, and has the photosensitive layer adapted to form a positioning indicia for positioning the visible pattern being formed.

In one aspect of the invention, a photosensitive layer laminating method of transferring a photosensitive layer containing resin to a transfer region on a substrate is provided. In the photosensitive layer laminating method, at least first and second photosensitive materials are transported to the substrate, wherein the first and second photosensitive materials respectively include a support and the photosensitive layer overlaid thereon, have a width smaller than a width of the transfer region, and are disposed to extend along one another. The photosensitive layer from the first and second photosensitive materials is applied to the transfer region on the substrate with heat and pressure.

The first and second photosensitive materials are unwound from respectively first and second photosensitive material rolls. The applying step is effected in first and second laminating domains which are arranged in a direction crosswise to transport of the first and second photosensitive materials, and are supplied with respectively the first and second photosensitive materials.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
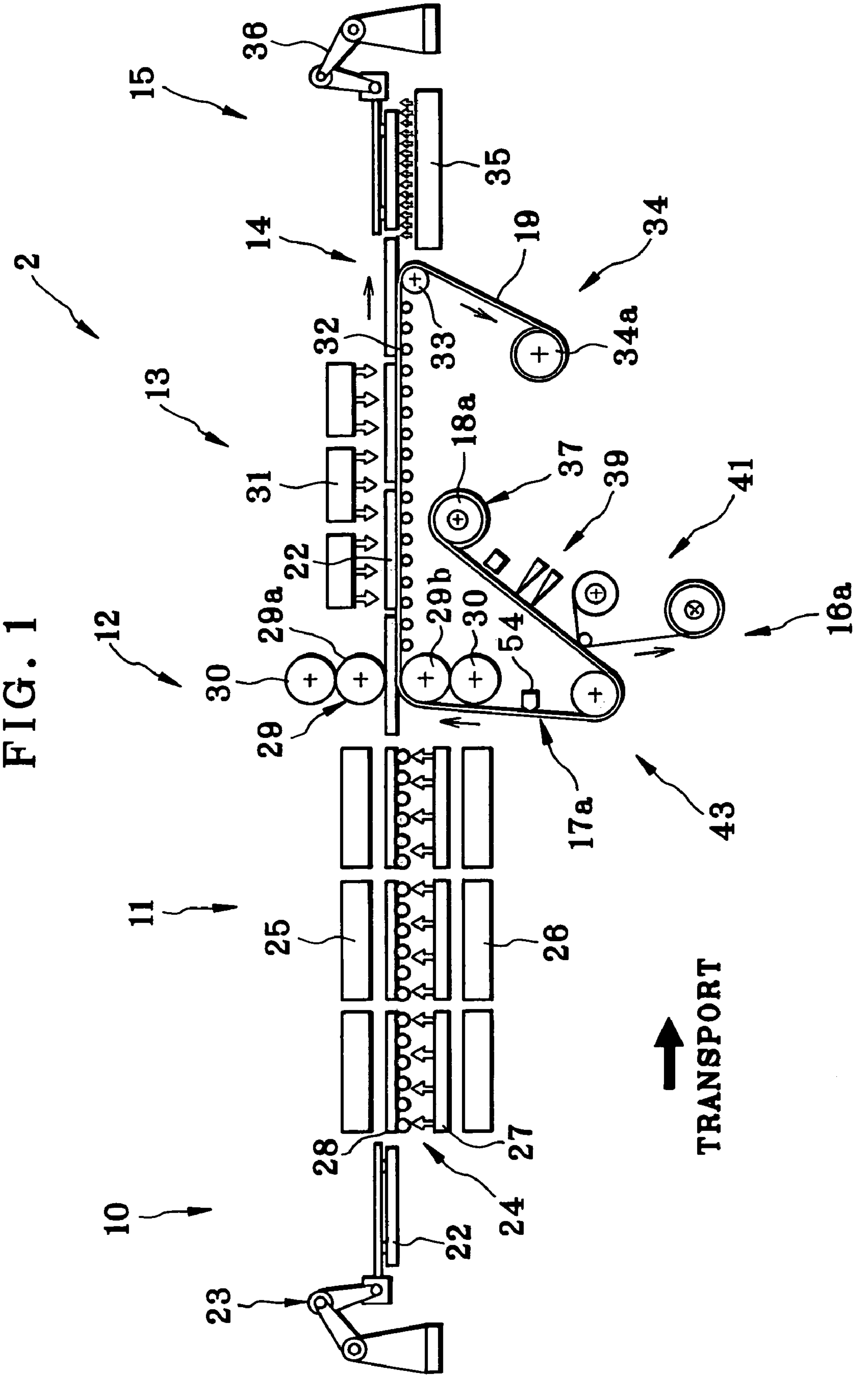
FIG. 1 is an side elevation illustrating a photosensitive layer laminator.
Figure 3:
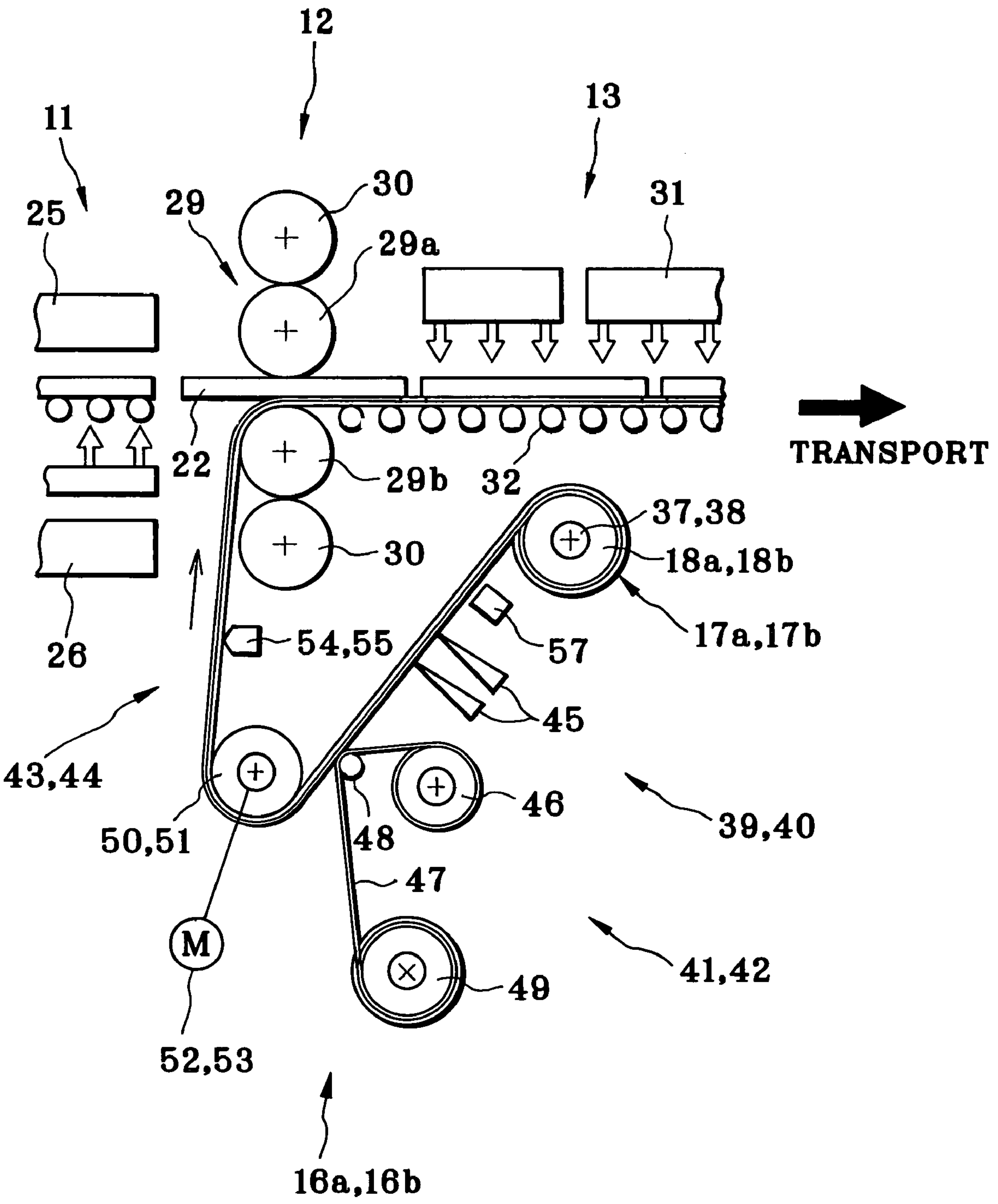
FIG. 3 is a side elevation, partially cutaway, illustrating a photosensitive material feeder.

In FIG. 1, a photosensitive layer laminator 2 is illustrated, and includes a substrate feeder 10, a preheater 11, a laminating mechanism 12 with heat and pressure, a cooler 13, a support peeler 14, a panel ejector 15, and a photosensitive material feeder 16. The photosensitive material feeder 16, as depicted in FIGS. 1 and 3, includes a first feeding mechanism **16*a* and a second feeding mechanism 16*b*. The first feeding mechanism 16*a* is loaded with a first photosensitive material roll 18*a*, which is formed by winding first long photosensitive material 17*a*. The second feeding mechanism 16*b* is loaded with a second photosensitive material roll 18*b*, which is formed by winding second long photosensitive material 17*b*. The first feeding mechanism 16*a* unwinds the first photosensitive material 17*a* from the first photosensitive material roll 18*a*, and supplies the same into a transporting path. Similarly, the second feeding mechanism 16*b* unwinds the second photosensitive material 17*b* for supply in a manner parallel with a direction of the first photosensitive material 17*a***.

Figure 2:
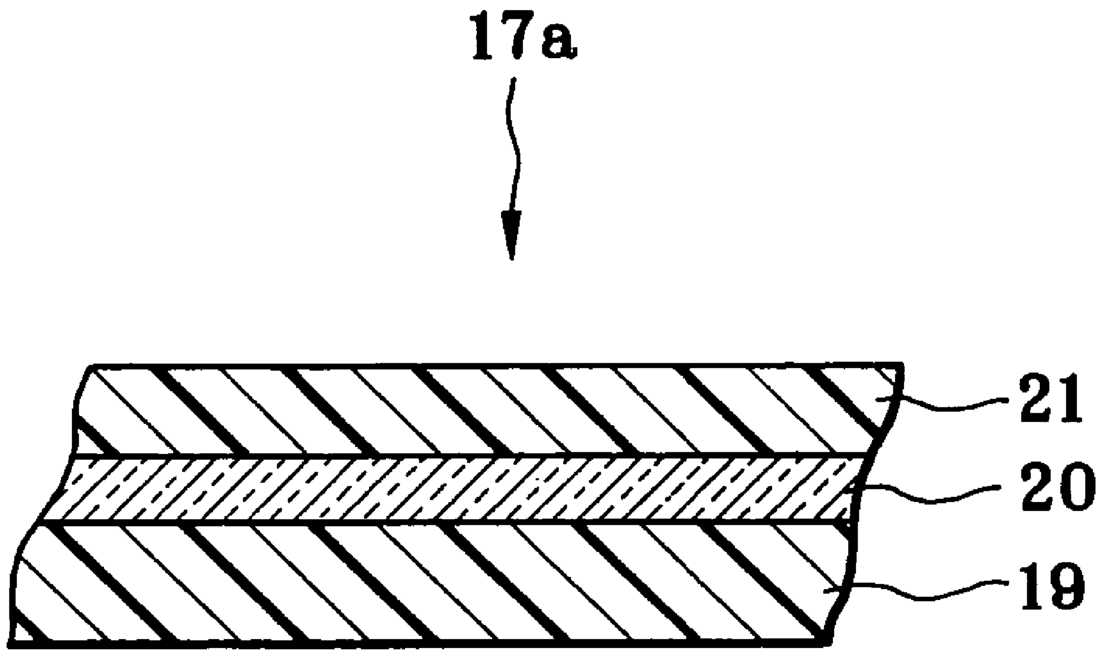
FIG. 2 is a cross section illustrating a photosensitive material.

In FIG. 2, each of the first and second photosensitive materials **17*a* and 17*b* includes a support sheet 19 of resin film, and a photosensitive layer 20 overlaid thereon. The photosensitive layer 20 is used for forming a color filter. A cover film 21 for protection is overlaid on the photosensitive layer 20 in a peelable manner. To produce a panel for a color display device, the first and second photosensitive materials 17*a* and 17*b* for one of three primary colors of red, green and blue for the three filters are used. There is a glass substrate 22 or substrate containing resin or other transparent rigid material, to which one layer is transferred in a frame-sequential manner color after color. At first the photosensitive material rolls 18*a* and 18*b* for the red color are set, to transfer the red photosensitive layer to the substrate 22**. After the transfer, photo lithographic operation is effected to expose and develop the photosensitive layer, to form a filter pattern. The photosensitive layer with the pattern is baked, and fixed on the substrate.

After the baking, the substrate 22 with filter patterning of the red color is loaded in the photosensitive layer laminator 2 again. The photosensitive material rolls **18*a* and 18*b* for the green color are set, to transfer the green photosensitive layer to the substrate 22. In a similar manner to the red photosensitive layer, the green photosensitive layer is patterned for the filter patterning, and fixed by baking. After this, the substrate 22 with filter patterning of the blue color is loaded in the photosensitive layer laminator 2 again. The blue photosensitive layer is transferred to the substrate 22. In a manner similar manner, the blue photosensitive layer is patterned, and fixed by baking. After this filter patterning of the three colors, the black (BK) photosensitive layer is transferred to the substrate 22** in order to fill fine gaps between the patterned portions.

In FIG. 1, a supply robot hand 23 is incorporated in the substrate feeder 10, and supplies the substrate 22 to the preheater 11 in an orientation with its transfer surface directed down and periodically at a regular interval. A preferred example of the substrate 22 has a size of a 2×2 combination of four panels. When lamination to form a color filter is completed, the substrate 22 will be cut into four.

The preheater 11 includes a substrate transporting mechanism 24 and heater units 25 and 26. The substrate transporting mechanism 24 is constituted by a flotation blower 27 of a board form and a number of transporting rollers 28. The flotation blower 27 is disposed under a path for the substrate 22, and opposed to a transfer surface of the substrate 22, blows clean air over the transfer surface to float the substrate 22.

The transporting rollers 28 contact lateral edge operations of the transfer surface of the substrate 22 being floated, and rotate to transport the substrate 22 toward the laminating mechanism 12 for heat and pressure. There occurs no transfer to those edge portions of the transfer surface. In those portions, the transporting rollers 28 does not contact the photosensitive layer 20. The transporting rollers 28 are structurally flange-formed rollers, have a flange (not shown), which guides the substrate 22 and regulates the position of the substrate 22 in the width direction.

The heater units 25 and 26 are arranged above and below the path for the substrate 22 in the substrate transporting mechanism 24, and disposed in suitable numbers of a plurality. The heater units 25 and 26 heat the substrate 22 up to the temperature in a range of, for example, 50–110° C. The substrate 22 heated by the preheater 11 is transported by the transporting rollers 28 to the laminating mechanism 12.

The laminating mechanism 12 is constituted by a heat/pressure roller set 29 and backup rollers 30. In the heat/pressure roller set 29, a first heat/pressure roller 29*a* contacts the substrate 22 as lamination roll. A second heat/pressure roller 29*b* contacts the first and second photosensitive materials 17*a* and 17*b* as lamination roll. A heater is incorporated in each one of the heat/pressure rollers 29*a* and 29*b* and the backup rollers 30. The heat/pressure roller set 29 squeezes and transports the substrate 22 and the first and second photosensitive materials 17*a* and 17*b*, so as to attach the first and second photosensitive materials 17*a* and 17*b* to the substrate 22 with heat and pressure. The backup rollers 30 are caused to rotate by contact of the heat/pressure rollers 29*a* and 29*b*, and uniformize the force for lamination with heat and pressure by suppressing flexing or distortion of the heat/pressure rollers 29*a* and 29*b*.

A half cut line formed by a half cutter blade group 45 in the first and second photosensitive materials 17*a* and 17*b* will be described later. When the half cut line moves past a predetermined position in the laminating mechanism 12, then a start signal is input to the substrate transporting mechanism 24. The photosensitive layer 20 is transferred from the first and second photosensitive materials 17*a* and 17*b* to the substrate 22 in a state with the half cut line positioned on the substrate 22. At this time, the support 19 is transported in the downstream direction from the heat/pressure roller set 29 according to movement of the substrate 22.

The cooler 13 includes a cool gas blower 31 of a board form, and transporting rollers 32. Cool air is passed through a HEPA (high efficiency particulate air) filter to obtain clean cool air, which is directed by the cool gas blower 31 to blow the substrate 22. Thus, the substrate 22 is cooled to the room temperature which may be 30° C. or lower while transported by the transporting rollers 32.

The support peeler 14 is constituted by a peeling roller 33 and a support sheet winder 34. The peeling roller 33 consecutively peels the support 19 from the substrate 22 to be a laminated panel. A support sheet spindle 34*a* of the winder 34 winds and withdraws the support 19 in a roll form. A motor (not shown) causes the spindle 34*a* to rotate. The motor is controlled for its torque, in order to maintain tension applied to the support 19 at a constant level in a zone downstream from the heat/pressure roller set 29, so as to prevent occurrence of flexing or looseness in the support 19.

The panel ejector 15 is positioned downstream from the support peeler 14, and has a flotation blower 35 of a board form. The flotation blower 35 is structurally the same as the flotation blower 27 in the preheater 11. Also, a robot hand 36 is disposed in the panel ejector 15. The laminated panel including the substrate 22, when transported from the support peeler 14 to the panel ejector 15, is sucked by a suction device in the robot hand 36, and picked up and ejected.

In FIG. 3, the first feeding mechanism 16*a* includes a supply spindle 37, a half cutter 39, a cover peeler 41 and a tension adjuster 43. In a manner separate from this, the second feeding mechanism 16*b* includes a supply spindle 38, a half cutter 40, a cover peeler 42 and a tension adjuster 44. The photosensitive material rolls 18*a* and 18*b* are set on respectively the supply spindles 37 and 38.

Each of the half cutters 39 and 40 includes the half cutter blade group 45. The first photosensitive material 17*a* has a photosensitive layer 20*a* and cover film 21*a*. The second photosensitive material 17*b* has a photosensitive layer 20*b* and cover film 21*b*. The half cutter 39 cuts the photosensitive layer 20*a* and the cover film 21*a*, but keeps the support 19 uncut. Similarly, the half cutter 40 cuts the photosensitive layer 20*b* and the cover film 21*b*, but keeps the support 19 uncut. A relationship between the half cutters 39 and 40 is based on a size of a transfer region 22*a* of the substrate 22. The half cutter blade group 45 includes two blades with cutting edges extending in the width direction of the first and second photosensitive materials 17*a* and 17*b*. An interval between the two blades is defined according to an interval or period of the transport of the substrate 22 one after another. To be precise, the interval between the blades is set equal to an interval between a rear end of the transfer region 22*a* of a first substrate and a front end of the transfer region 22*a* of a second substrate succeeding to the first. The two are actuated at the same time, to form two cuts simultaneously for the appropriate positions.

The cover peeler 41 peels the cover film 21*a* from the first photosensitive material 17*a* after cutting of the photosensitive layer 20*a*. The cover peeler 42 peels the cover film 21*b* from the second photosensitive material 17*b* after cutting of the photosensitive layer 20*b*. Each of the cover peelers 41 and 42 is loaded with a peeling tape roll 46. A pressure-sensitive adhesive tape 47 is unwound from the peeling tape roll 46. A pressure roller 48 presses the adhesive tape 47 on to the cover film 21. The adhesive tape 47 adheres to the cover film 21. A tape spindle 49 winds up and withdraws the adhesive tape 47, so that the adhesive tape 47 takes away the cover film 21 for withdrawal.

Figure 5:
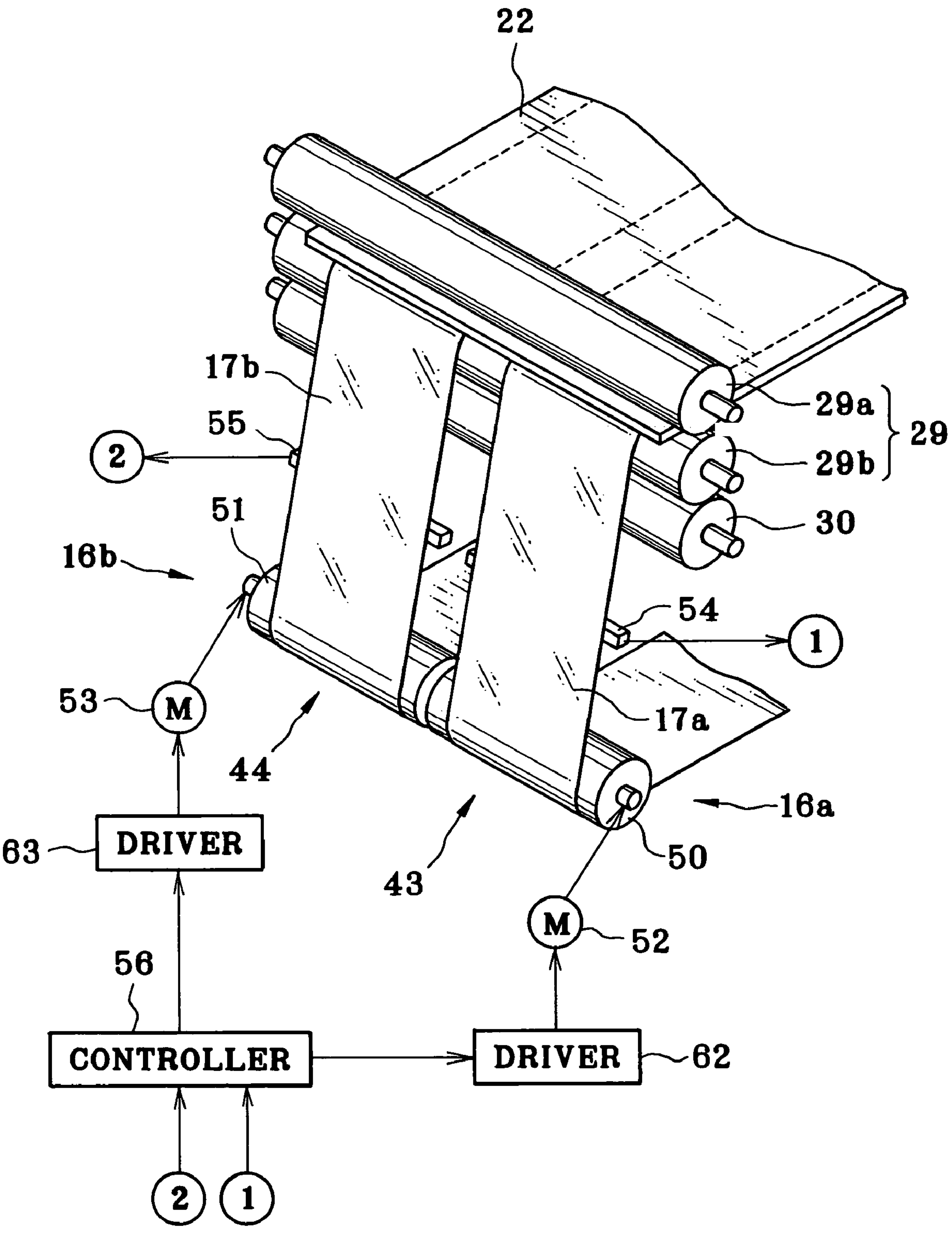
FIG. 5 is a perspective view illustrating first and second feeding mechanisms adjacent to each other.

The tension adjuster 43 is constituted by a tension roller 50, a motor 52 and a tension sensor or detector 54. Similarly, the tension adjuster 44 includes a tension roller 51, a motor 53 and a tension sensor or detector 55. The tension rollers 50 and 51 operate according to tension detected by the tension detectors 54 and 55, keep constant the tension of a portion of the first and second photosensitive materials 17*a* and 17*b* positioned upstream from the heat/pressure roller set 29, so as to prevent flexing or looseness of the first and second photosensitive materials 17*a* and 17*b*. An example of the tension detectors 54 and 55 is a tension pickup (TP) device having a rotatable roll with a small diameter. There is a controller 56 as illustrated in FIG. 5. Information of the tension detected by the tension detectors 54 and 55 is input to the controller 56, which responsively adjusts the tension by controlling a rotational speed and a rotating amount of the motors 52 and 53.

A position control device 57 is a single device for the first and second photosensitive materials 17*a* and 17*b*. The position control device 57 operates to regulate a distance between the first and second photosensitive materials 17*a* and 17*b* at a predetermined level, to stabilize the transport of the first and second photosensitive materials 17*a* and 17*b*. It is to be noted that the position control device 57 may be added to other positions in a suitable manner to keep high precision in transporting the first and second photosensitive materials 17*a* and 17*b*.

Figure 4:
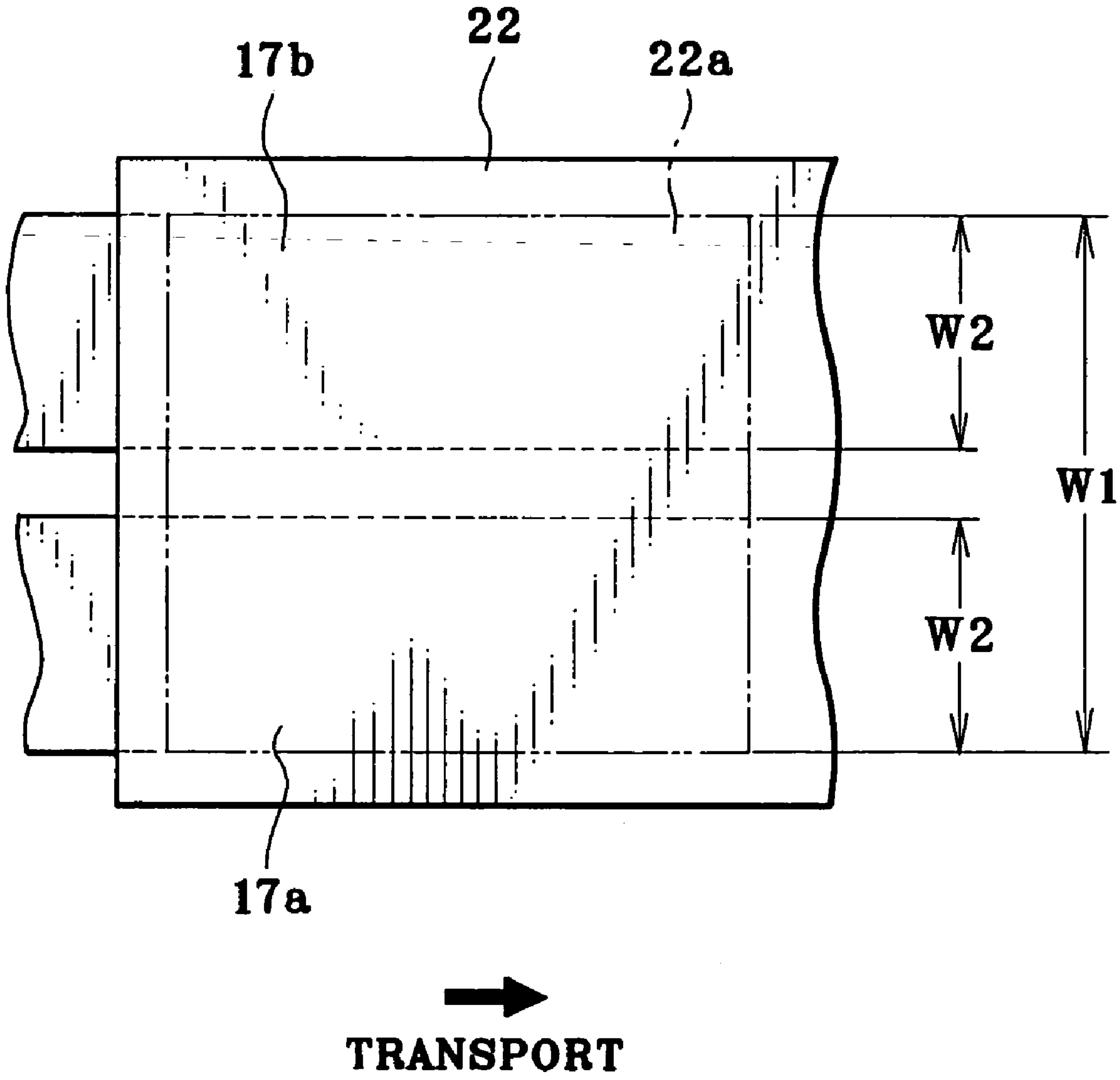
FIG. 4 is a plan, partially cutaway, illustrating a substrate and a transfer region defined on the substrate.

In FIG. 4, let W1 a width of the entirety of the transfer region 22*a* of the substrate 22. Let W2 be a width of the first and second photosensitive materials 17*a* and 17*b*. The first and second photosensitive materials 17*a* and 17*b* satisfy W2<W1. More precisely, the following condition is satisfied:

$$W2 \leq \frac{1}{2} \times W1$$

The first and second photosensitive materials 17*a* and 17*b* are transported in parallel with one another. The photosensitive layer 20 can be transferred to nearly the entire area of the transfer region 22*a*. Thus, the parallel supply of the photosensitive materials having the smaller width than the transfer region 22*a* is effective in transferring the photosensitive layer to the entirety of the transfer region 22*a*. There is no need of using a differently designed photosensitive material with a greater width.

In FIG. 5, the tension rollers 50 and 51 for the first and second feeding mechanisms 16*a* and 16*b* are positioned in a manner coaxial with one another. A motor driver 62 is connected with the motor 52 to drive the tension roller 50. Separately from this, a motor driver 63 is connected with the motor 53 to drive the tension roller 51. The controller 56 controls the motors 52 and 53, to adjust tension of the first and second photosensitive materials 17*a* and 17*b*. Should a single tension roller be used for transporting plural strips of photosensitive materials, it is impossible to keep the tension at an unchanged level, because of occurrence of a slip in at least one of the plural photosensitive materials. In the present embodiment, the tension adjuster is associated with each strip of the long photosensitive material for individual control. This is effective in maintaining tension of the photosensitive material at a constant level.

The operation of the above construction is hereinafter described. The supply robot hand 23 in the substrate feeder 10 supplies the preheater 11 with the substrate 22. The substrate 22 in the preheater 11 is initially heated by the heater units 25 and 26, and sent to the laminating mechanism 12 for heat and pressure. The first and second feeding mechanisms 16*a* and 16*b* supply the first and second photosensitive materials 17*a* and 17*b* to the substrate 22 in the laminating mechanism 12 in a parallel orientation with one another.

In a step prior to supply of the laminating mechanism 12 with the first and second photosensitive materials 17*a* and 17*b*, the controller 56 controls the first and second feeding mechanisms 16*a* and 16*b* in a manner separate from one another to pre-treatment of the first and second photosensitive materials 17*a* and 17*b*. The half cutter blade group 45 in each of the half cutters 39 and 40 forms cuts in the first and second photosensitive materials 17*a* and 17*b* according to a length of the transfer region 22*a* of the substrate 22, before transport to the cover peelers 41 and 42. The cover peelers 41 and 42 peel an uppermost film piece constituted by the cover films 21*a* and 21*b* from the photosensitive layer 20*a* and 20*b* as overlaid element in the first and second photosensitive materials 17*a* and 17*b*. The first and second photosensitive materials 17*a* and 17*b* after moving past the cover peelers 41 and 42 are transported to the laminating mechanism 12 with their tension kept constant and equal by the tension adjusters 43 and 44.

The first photosensitive material 17*a* supplied from the first feeding mechanism 16*a* is transported through the heat/pressure roller set 29 of the laminating mechanism 12 in a state positioned at the transfer region 22*a* of the substrate 22. The photosensitive layer 20*a* in the first photosensitive material 17*a* is transferred to the transfer region 22*a*. Similarly, the second photosensitive material 17*b* from the second feeding mechanism 16*b* moves through the heat/pressure roller set 29 of the laminating mechanism 12 as positioned at the transfer region 22*a* of the substrate 22. The photosensitive layer 20*b* in the second photosensitive material 17*b* is transferred to the transfer region 22*a*. The substrate 22 after the transfer of the photosensitive layer 20*a* or 20*b* is sent to the cooler 13, cooled by blowing cool gas from the cool gas blower 31, and moved to the support peeler 14. The support peeler 14 winds up the support from the first and second photosensitive materials 17*a* and 17*b* on the spindle 34*a*, to peel the support. A laminated panel having the substrate 22 after peeling of the support of the first and second photosensitive materials 17*a* and 17*b* is moved to the panel ejector 15, is grasped by the robot hand 36 upwards according to suction, and is ejected.

It is possible in the photosensitive material feeder 16 that the first and second photosensitive materials 17*a* and 17*b* being transported together have a width smaller than a width of the transfer region 22*a* of the substrate 22. Thus, it is unnecessary to raise a width or size of a structure for feeding the photosensitive material. The entire area of the substrate can be laminated easily without largely modifying the structure of the laminator. Also, the first and second photosensitive materials 17*a* and 17*b* with the smaller width than the conventional photosensitive material are remarkably easy to handle. Occurrence of wrinkles of the first and second photosensitive materials 17*a* and 17*b* can be suppressed efficiently, to cause handling with great ease without lowering quality.

In the above embodiment, various mechanisms for the supply are associated with the photosensitive material rolls 18*a* and 18*b* as plural sets in a separate manner from one another, including the tension adjusters 43 and 44, the half cutters 39 and 40, and the cover peelers 41 and 42. However, a single set of mechanisms can be used for the plural photosensitive materials. However, the separate sets of the half cutters 39 and 40 are advantageous because the individual control enables fine adjustment of the production of panels. In the above embodiment, one operation of the transfer for the lamination is a multi-sheet form for producing four panels. The length of the photosensitive layer to be transferred at one time is determined by a length cut by the half cutting. Therefore, adjustment of a cutting position makes it possible to, for example, transfer an amount of two panels for a first photosensitive material, and to transfer an amount of only one panel for a second photosensitive material. There are effects in reducing load in the developing process.

Figure 6:
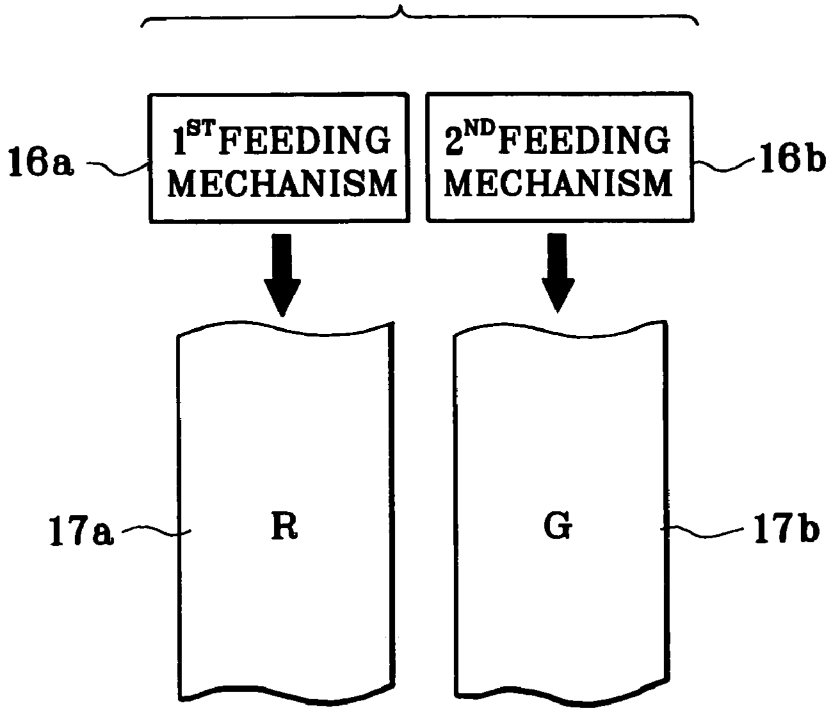
FIG. 6 is a plan, partially cutaway, illustrating another preferred set of two photosensitive materials for two colors.

In the above embodiment, the second photosensitive material 17*b* is for the same color as that for the first photosensitive material 17*a*. In FIG. 6, another preferred embodiment is illustrated. The first photosensitive material 17*a* is red photosensitive material, and is supplied by the first feeding mechanism 16*a*. The second photosensitive material 17*b* is green photosensitive material, is supplied by the second feeding mechanism 16*b*, and is transported in parallel with the first photosensitive material 17*a*. Also, the number of the feeding mechanisms 16*a* and 16*b* can be three or more instead of the two.

In the above embodiment, the second photosensitive material 17*b* has the width which is equal to that of the first photosensitive material 17*a*, and is equal to or less than ½ of the width W1 of the transfer region 22*a*. However, the width of the second photosensitive material 17*b* may be different from that of the first photosensitive material 17*a*. A width of the photosensitive material 17*a* or 17*b* may be more than ½ of the width of the transfer region 22*a*. For example, a width of the first photosensitive material 17*a* can be ⅔ as much as the width of the transfer region 22*a*, a width of the second photosensitive material 17*b* being ⅓ as much as the width of the transfer region 22*a*. This is advantageous in treating raw material with a temporarily small width. Changes in the width make it possible to utilize such raw material in spite of its small width in view of higher productivity in the manufacturing line.

Figure 7:
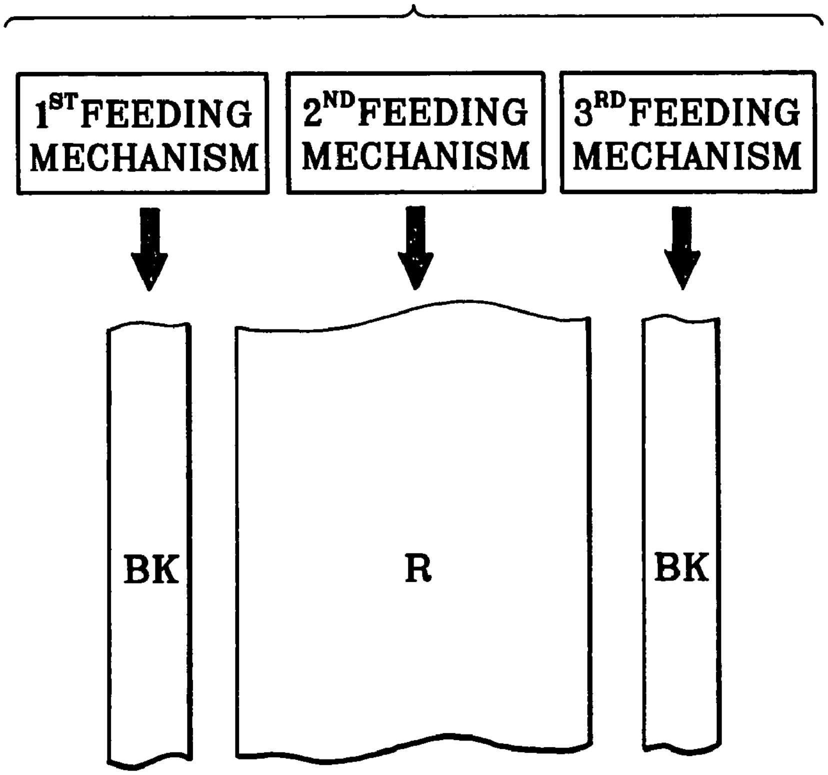
FIG. 7 is a plan, partially cutaway, illustrating still another preferred set of three photosensitive materials for the red and black for alignment of the red.

In FIG. 7, still another preferred embodiment is illustrated. A first black (BK) photosensitive material for developing black color is supplied by a first feeding mechanism. A red photosensitive material is supplied by a second feeding mechanism, and is transported in parallel with the first black photosensitive material. A second black (BK) photosensitive material is supplied by a third feeding mechanism, and is transported in parallel with those two. The black (BK) photosensitive materials are specialized in the use for transferring an alignment indicia or mark which is adapted to setting equal a position of transfer of primary colors. In general, it is known to form an alignment indicia by use of the same photosensitive layer as used for the transfer of the red photosensitive layer. However, the red color used for the alignment indicia has a problem in characteristically low contrast and low discernible properties in comparison with the black color. On the other hand, a step of transferring a photosensitive layer for the black color may be added for the alignment indicia. However, another problem arises in complication of the process according to adding one step. This considerably decreases the efficiency and productivity. In FIG. 7, transfer of photosensitive layers for the two additional alignment indicia are added to the red transfer. It is possible to form a pattern at an alignment indicia with high discernible properties and without raising the number of the steps in the production.

Note that according to the above embodiment, there is a gap between the first and second photosensitive materials 17*a* and 17*b* being transported together. However, such a gap may not exist. The first and second photosensitive materials 17*a* and 17*b* can run in such a manner that their longitudinal edges can contact one another exactly, or may overlap on one another at a small area.

In the above embodiment, paths of the transport of the first and second feeding mechanisms 16*a* and 16*b* are parallel with one another. However, the first feeding mechanism 16*a* may have a differently formed path from that of the second feeding mechanism 16*b*. For example, at least one of the first and second feeding mechanisms 16*a* and 16*b* can have a form to turn the photosensitive material 17*a* or 17*b* with 90 degrees, and can be disposed in horizontally separate zones, or vertically separate zones.

The transfer of the photosensitive material to a substrate according to the invention may be used in any of various panels in the fields of imaging or electricity, for example, panels for a liquid crystal display device, a plasma display device, and an organic electro luminescence (EL) panel, and also for a printed wiring board, a thin film transistor (TFT) board, and the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photosensitive layer laminator for transferring a photosensitive layer from a photosensitive material to a substrate by use of said photosensitive material including a support, and said photosensitive layer overlaid on said support and containing resin, said photosensitive layer laminator comprising:

- a laminating mechanism for applying said photosensitive layer of plural photosensitive materials to a transfer region on said substrate by applying heat and pressure to said plural photosensitive materials and said substrate;
- a photosensitive material feeder for supplying said laminating mechanism with said plural photosensitive materials directed substantially in parallel with one another and including first and second photosensitive materials, said plural photosensitive materials having a width smaller than a width of said transfer region; and
- a substrate feeder for supplying said laminating mechanism with said substrate in placement on said plural photosensitive materials,
- wherein said photosensitive material feeder comprises at least one position control device for regulating a distance between said plural photosensitive materials at a predetermined level.

2. A photosensitive layer laminator as defined in claim 1, wherein said laminating mechanism includes at least one pair of heat/pressure rollers for applying heat and pressure in moving said substrate and said plural photosensitive materials.

3. A photosensitive layer laminator as defined in claim 2, wherein said photosensitive material feeder includes:

- a first feeding mechanism for unwinding said first photosensitive material from a first photosensitive material roll, and supplying said first photosensitive material to said heat/pressure roller pair; and
- a second feeding mechanism for unwinding said second photosensitive material from a second photosensitive material roll, and supplying said second photosensitive material to said heat/pressure roller pair.

4. A photosensitive layer laminator as defined in claim 3, wherein a sum of said width of said at least first and second photosensitive materials is equal to or less than said width of said transfer region.

5. A photosensitive layer laminator as defined in claim 4, wherein each of said first and second feeding mechanisms includes a tension adjuster, including a tension roller, for individually adjusting respectively tension of said first and second photosensitive materials upstream from said heat/pressure roller pair.

6. A photosensitive layer laminator as defined in claim 5, wherein said tension adjuster includes:

a tension detector for measuring said tension applied to respectively said first and second photosensitive materials; and a controller responsive to information from said tension detector, for controlling said tension roller, and adjusting said tension.

7. A photosensitive layer laminator as defined in claim 6, wherein each of said first and second photosensitive materials includes cover film, overlaid on said photosensitive layer, for protection thereof.

8. A photosensitive layer laminator as defined in claim 7, further comprising at least one half cutter for forming a cut in said cover film and said photosensitive layer in a predetermined size adapted to said transfer region.

9. A photosensitive layer laminator as defined in claim 8, further comprising a cover peeler, disposed downstream from said half cutter, for peeing said cover film from said first and second photosensitive materials, wherein said cover peeler unwinds adhesive tape from a tape roll, sticks said adhesive tape to said cover film, and winds said adhesive tape with said cover film.

10. A photosensitive layer laminator as defined in claim 9, wherein said at least one half cutter comprises at least two half cutters associated with respectively said first and second feeding mechanisms, and adjustable according to said predetermined size of said photosensitive layer to be transferred.

11. A photosensitive layer laminator as defined in claim 2, further comprising:

a path for transport of said substrate in lamination with said photosensitive material downstream from said heat/pressure roller pair;

a cooler, disposed in said path, for cooling said substrate in lamination;

a peeling roller, disposed in said path downstream from said cooler, for peeling said support from said substrate in lamination; and a winding roller for winding said support being peeled.

12. A photosensitive layer laminator as defined in claim 2, wherein said photosensitive layer is colorable in a predetermined color which is selected from three primary colors and black color.

13. A photosensitive layer laminator as defined in claim 12, wherein said predetermined color is different between said at least first and second photosensitive materials.

14. A photosensitive layer laminator as defined in claim 2, wherein said at least first and second photosensitive materials are different in said width.

15. A photosensitive layer laminator as defined in claim 14, wherein said photosensitive layer of said first photosensitive material is adapted to form a predetermined visible pattern;

said second photosensitive material has a width smaller than a width of said first photosensitive material, and has said photosensitive layer adapted to form a positioning indicia for positioning a visible pattern succeeding to said visible pattern.

16. The photosensitive layer laminator according to claim 1, further comprising a preheater including a substrate transporting mechanism and at least one heater unit.

17. The photosensitive layer laminator according to claim 16, wherein the substrate transporting mechanism comprises a flotation blower and a plurality of transporting rollers.

18. The photosensitive layer laminator according to claim 17, wherein the flotation blower is disposed under a path for the substrate, and is disposed opposite a transfer surface of the substrate, and is configured to blow clean air over the transfer surface to float the substrate.

* * * * *